(12) United States Patent
Hartness, III et al.

(10) Patent No.: US 6,612,420 B1
(45) Date of Patent: Sep. 2, 2003

(54) DEVICE FOR TRANSFERRING ARTICLES BETWEEN OPPOSITELY RUNNING CONVEYORS

(75) Inventors: William R. Hartness, III, Greenville, SC (US); Thomas P. Hartness, Greenville, SC (US); David N. Cooley, Port Orange, FL (US)

(73) Assignee: Hartness International, Inc., Greenville, SC (US)

( * ) Notice: Subject to any disclaimer, the term of this patent is extended or adjusted under 35 U.S.C. 154(b) by 0 days.

(21) Appl. No.: 09/690,320

(22) Filed: Oct. 17, 2000

(51) Int. Cl.⁷ ................................................ B65G 37/00
(52) U.S. Cl. ....................... 198/597; 198/594
(58) Field of Search ............... 198/364, 457.06, 198/594, 597

(56) References Cited

U.S. PATENT DOCUMENTS

| | | |
|---|---|---|
| 3,270,863 A | 9/1966 | Ackles |
| 3,318,439 A | 5/1967 | Sullivan |
| 4,018,325 A | 4/1977 | Rejsa |
| 4,063,632 A | 12/1977 | Neth et al. |
| 4,201,286 A | 5/1980 | Meier |
| 4,364,465 A | 12/1982 | Kraft et al. |
| 4,401,020 A | 8/1983 | Brvx |
| 4,413,724 A | 11/1983 | Fellner |
| 4,469,219 A | 9/1984 | Cossé |
| 4,513,858 A | 4/1985 | Fellner |
| 4,549,647 A | 10/1985 | Cossé |
| 4,718,656 A | 1/1988 | Reist |
| 4,889,223 A | 12/1989 | Bergstrom |
| 4,944,315 A | 7/1990 | Focke |
| 4,989,718 A | 2/1991 | Steeber |
| 5,067,857 A | 11/1991 | Ward |
| 5,350,050 A | 9/1994 | Franke |
| 5,413,213 A | 5/1995 | Golz et al. |
| 5,417,317 A | 5/1995 | Kalinich |
| 5,490,589 A | 2/1996 | Golz et al. |
| 5,636,723 A | 6/1997 | Bulle et al. |
| 5,690,463 A | 11/1997 | Yoshie |

(List continued on next page.)

FOREIGN PATENT DOCUMENTS

| | | |
|---|---|---|
| DE | 1262886 | 3/1968 |
| DE | 2307728 | 9/1974 |
| DE | 2618905 | 11/1977 |
| DE | 19856649 A1 | 12/1998 |
| EP | 0635414 A1 | 1/1995 |
| GB | 0831911 | 9/1957 |
| WO | 0043294 | 7/2000 |

OTHER PUBLICATIONS

International Search Report for International Application No. PCT/US00/12958, filed May 12, 2000, entitled "Device for Transferring Articles Between Oppositely Running Conveyors".

*Primary Examiner*—Joseph E. Valenza
(74) *Attorney, Agent, or Firm*—Dority & Manning (57) ABSTRACT

An apparatus is provided for controlling the flow of articles. The apparatus includes a first conveyor driven in a first direction and a second conveyor driven in a second opposite direction. The conveyors extend in a side-by-side and parallel relationship with a space defined therebetween. A movable transport member is disposed within the space between the conveyors and defines a bridge that extends across the space and is generally flush with the upper surfaces of the conveyors. The transport member is drivingly engaged by the conveyors so as to move linearly between the conveyors depending on a speed differential of the conveyors. At least one article transfer member comprising a driven article propelling member is carried by the transport member and is disposed transversely to the conveyors to contact and drivingly transfer the articles from the first conveyor over the bridge member and onto the second conveyor.

25 Claims, 5 Drawing Sheets

U.S. PATENT DOCUMENTS

| | | |
|---|---|---|
| 5,722,655 A | 3/1998 | Reist |
| 5,772,005 A | 6/1998 | Hänsch |
| 5,903,464 A | 5/1999 | Stingel, Jr. et al. |
| 6,026,947 A | 2/2000 | Persson |
| 6,152,291 A | 11/2000 | Steeber |
| 6,182,812 B1 * | 2/2001 | Hartness et al. ............. 198/597 |
| 6,230,874 B1 * | 5/2001 | Steeber et al. .............. 198/594 |
| 6,260,688 B1 * | 7/2001 | Steeber et al. .............. 198/594 |

* cited by examiner

DEVICE FOR TRANSFERRING ARTICLES BETWEEN OPPOSITELY RUNNING CONVEYORS

BACKGROUND OF THE INVENTION

The present invention relates to a device for controlling the transfer of articles between oppositely running conveyors.

There are many applications wherein oppositely running conveyors disposed side by side and generally parallel are used for transporting articles. A common such use is in conveying accumulator systems utilized between an upstream delivery station and a downstream receiving station to accumulate or store articles when the capacity of the downstream receiving station is either shut down or run at a speed wherein it cannot handle the number of articles being fed by the upstream delivery station. Such accumulator conveying systems are well known to those skilled in the art. One particular accumulator is disclosed in U.S. Pat. No. 4,018,325. An additional prior art accumulator system is disclosed in U.S. Pat. No. 4,513,858. With such accumulator systems, and any other system wherein articles are transferred from one conveyor running in one direction onto another conveyor running in an opposite direction, a device must be provided for controlling the transfer of the articles from one conveyor onto the other.

The present invention relates particularly to an improved transport device utilized for controlling the transfer of articles from a first conveyor running in a first direction onto a second conveyor running in a second opposite direction.

OBJECTS AND SUMMARY OF THE INVENTION

It is therefore a principal object of the present invention to provide an improved apparatus for controlling the flow of articles, particularly the flow of articles from a first conveyor driven in a first direction onto a second conveyor driven in a second direction.

Another important object of the present invention is to provide an article storage accumulator which permits a large number of articles to be stored in a relatively small amount of floor space.

An additional object of the present invention is to provide a system that includes a first conveyor driven in a first direction and a second conveyor driven in a second direction, as well as an improved transport member utilized to movably propel articles from the first conveyor onto the second conveyor with a driven first article transfer member.

Yet still another object of the present invention is to provide a second article transfer member remote from the first article transfer member which may also movably propel articles from the first conveyor onto the second conveyor.

Additional objects and advantages of the invention will be set forth in the following description, or may be obvious from the description, or may be learned through practice of the invention.

The present invention has particular application in conveyor accumulator systems wherein oppositely running and parallel conveyors are used to accumulate and store articles between an upstream receiving station and a downstream delivery station. One such accumulator system is disclosed and described in co-pending U.S. patent applications Ser. No. 08/235,888 entitled "Apparatus for Controlling the Flow of Articles" and Ser. No. 09/365,119 entitled "Device for Transferring Articles between Oppositely Running Conveyors." The '888 and '119 application are incorporated herein in their entirety for all purposes.

Although conveyors are a feature of the present invention, conventional conveyors are well known to those skilled in the art and need not be described herein in great detail. The features of the conveyors necessary for an understanding of the invention will be sufficiently described.

In accordance with the objects and purposes of the invention, an apparatus is provided for controlling the flow of articles. This apparatus includes a first conveyor driven in a first direction to convey articles thereon in the first direction. A second conveyor is driven in a second opposite direction to convey articles thereon in the opposite direction. As mentioned above, the first and second conveyors may be used in a conventional accumulator system. The conveyors extend generally side by side and parallel with a constant space defined between the inside edges thereof.

A movable transport member is disposed within the space defined between the conveyors and comprises a bridge that extends across the space between the conveyors and is generally flush with the upper surfaces of the conveyors. The transport member is drivingly engaged by both of the conveyors so as to move linearly between the conveyors depending on a speed differential of the conveyors. In other words, the transport member and bridge move in the direction of the faster conveyor. If both conveyors are moving linearly in opposite directions but at the same speed, the transport member remains stationary relative to the conveyors.

An article transfer member is carried by the transport member and is operably disposed relative to one of the conveyors. The transfer member possesses an article propelling member which contacts the side of the articles to propel the articles from one conveyor to the next depending on the disposition of the article transfer member. For example, The article transfer member may be disposed relative to the first conveyor allowing the article propelling member to contact and drivably transfer articles from the first conveyor to the second conveyor.

The transport member may comprise a drive wheel that is simultaneously engaged by drive lugs on each of the conveyors. The drive wheel has gear teeth engaged by the drive lugs so as to continuously rotate so long as at least one of the conveyors is moving. The transport member may comprise any manner of frame or structure. In a preferred embodiment, the transport member comprises a relatively simple carriage that is connected at one end to the drive wheel.

In a preferred embodiment, the bridge member comprises a deformable rail having dimensions so as to fit between the conveyors within the space defined between the conveyor edges. The rail has a longitudinal length to define a length of the bridge member. In a preferred embodiment, the bridge member is comprised of a plurality of pivotally connected links having an upper surface that is generally flush with the upper surface of the conveyors. The links are pivotally connected and thus deformable so that the transport member and bridge can easily follow curves or turns in the conveyors.

In a preferred embodiment, the article transfer member, carried by the transport member, is disposed transversely to the conveyors. The article propelling member is driven by the drive wheel of the carriage. The drive wheel causes the article propelling member to rotate in the direction from the first conveyor towards the second conveyor, propelling the articles that contact it from the first conveyor in the direction of the second conveyor as described above.

In another preferred embodiment, a second article transfer member is connected to the end of the bridge remote from the carriage and first article transfer member. The second article transfer member is operably disposed above and between the conveyor and also comprises an article propelling member driven by the drive wheel of the carriage. The article propelling member of the second transfer member also aids in rotatably propelling the articles from the first conveyor to the second conveyor. In this embodiment, the first article transfer member may be driven or movable or it may be stationary, such as a deflecting rail.

The invention will be described below in greater detail through use of the attached figures.

DETAILED DESCRIPTION

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment may be utilized on another embodiment to yield still a further embodiment. It is intended that the present invention include such modifications and variations.

Figure 1:
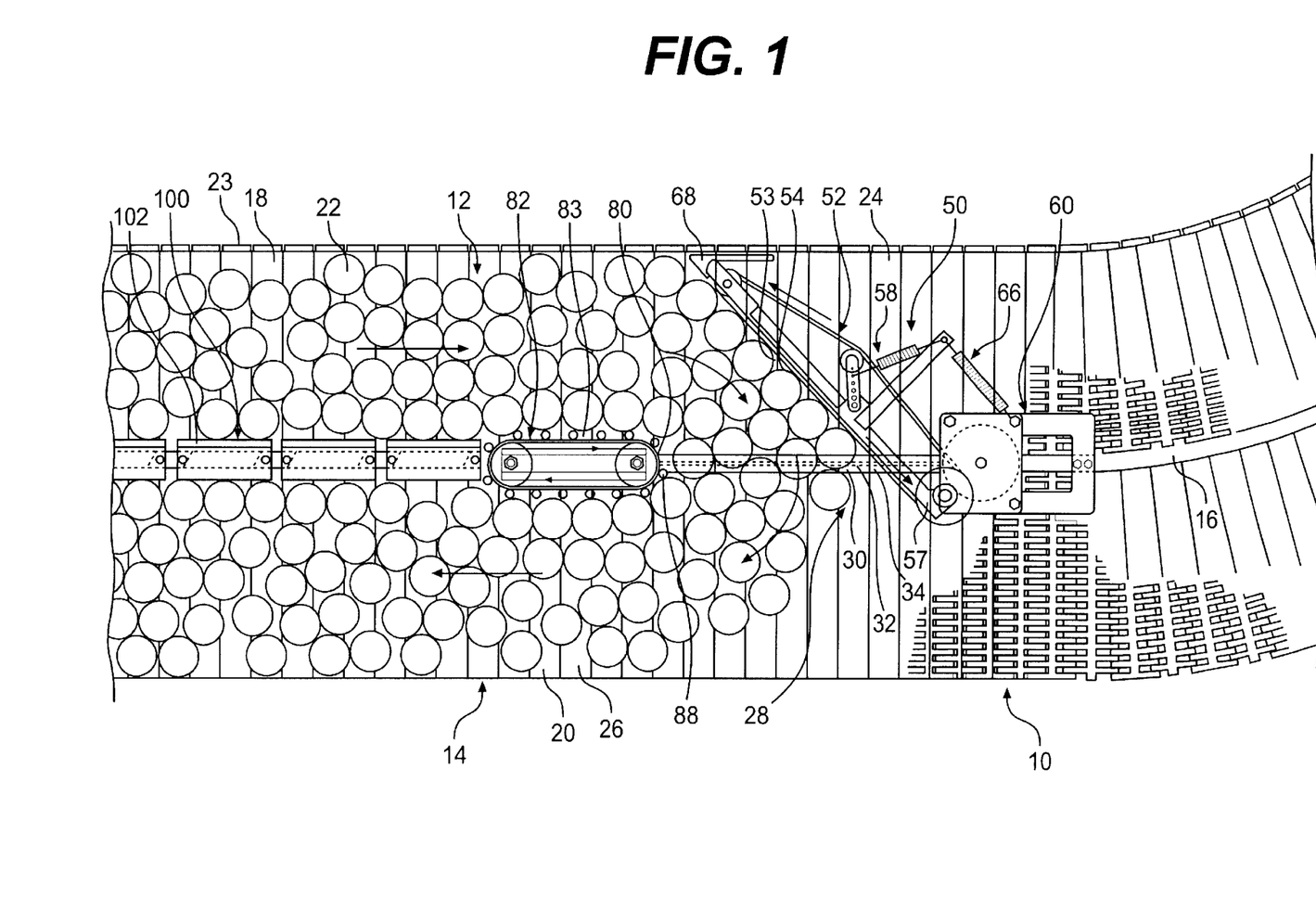
FIG. 1 is a perspective view of an apparatus for controlling the flow of articles according to the invention particularly illustrating articles being transferred from a first conveyor onto a second conveyor.
Figure 2:
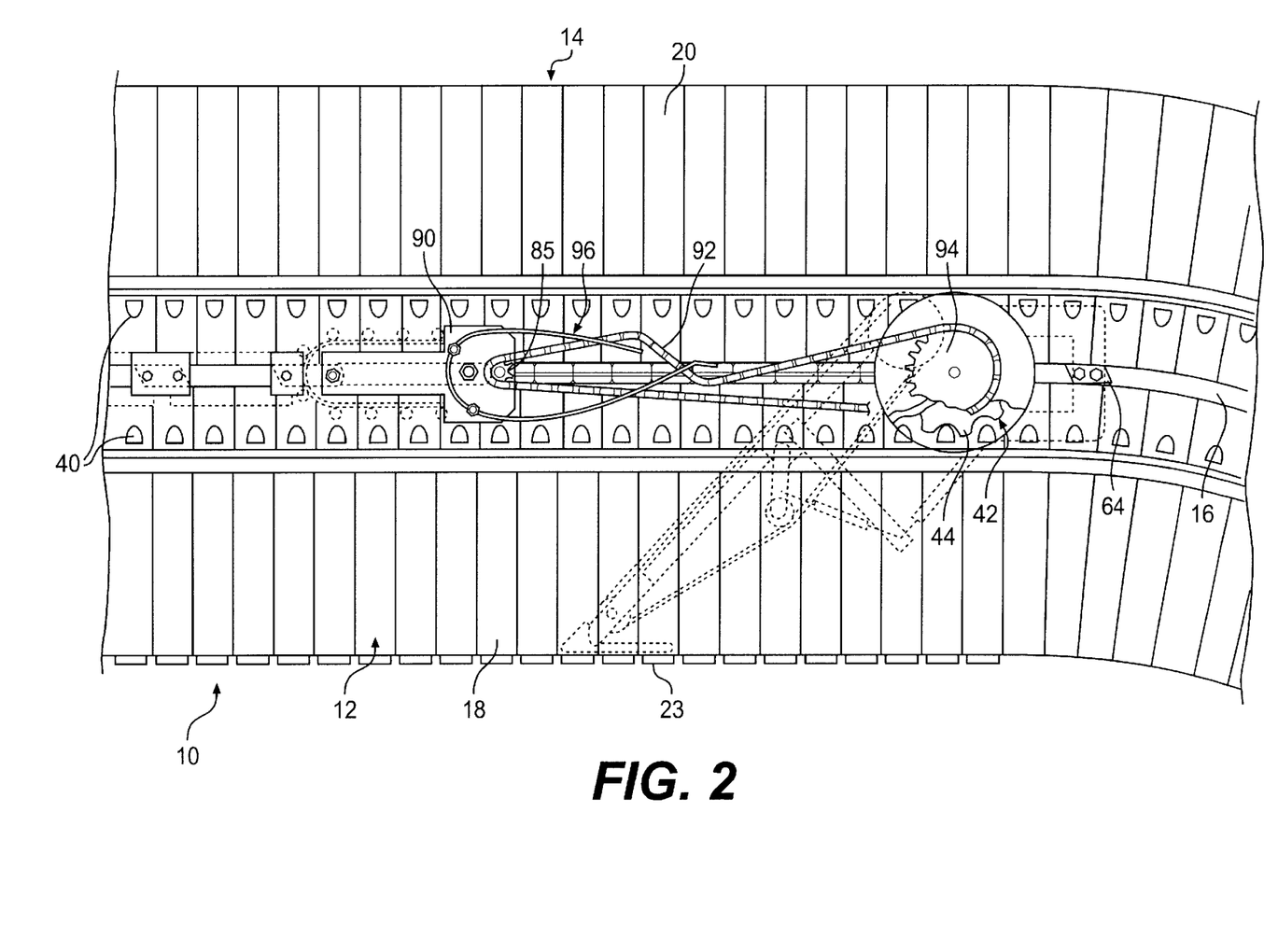
FIG. 2 is a perspective view of the apparatus of FIG. 1 from the underside of the conveyors particularly illustrating the drive system for the transport member, the first article transfer member and the second article transfer member according to the invention.

An apparatus, generally 10, for controlling the flow of articles according to the invention is illustrated generally in FIGS. 1–2. Apparatus 10 includes a first conveyor 12 that moves in a first direction, and second conveyor 14 that moves in a second opposite direction. The first and second conveyors 12,14 are arranged in a side-by-side and parallel relationship such that a constant space 16 is defined between the inside edges of the conveyors. Conveyors 12,14 may be formed as any conventional conveyor, including conventional link-type conveyors, belt conveyors, and the like.

The present invention is not limited to any particular conveying system and has application in any system wherein articles are to be moved from a first conveyor onto a second conveyor. As mentioned above, a conventional system incorporating such oppositely moving and parallel conveyors is an accumulator system used for accumulating and storing articles between an upstream receiving station and a downstream delivery station. A detailed description of an accumulator system is provided in co-pending U.S. patent application Ser. No. 09/235,888 entitled "Apparatus for Controlling the Flow of Articles." The '888 application is incorporated herein in its entirety for all purposes.

Figure 4A:
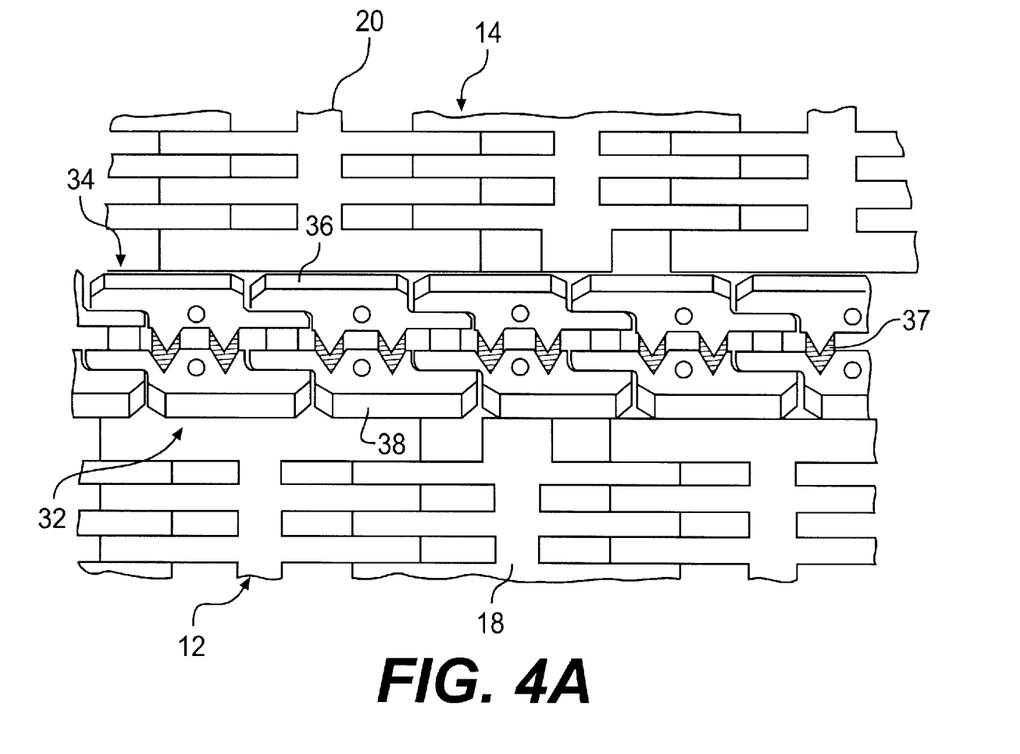
FIG. 4a is a perspective view of the deformable rail member utilized in the present invention.

As shown in FIG. 4A, conveyors 12,14 may be formed of individual interconnected segments or links 18,20, as is well understood by those skilled in the art. Conveyors 12,14 define upper conveying surfaces 24,26 upon which articles are placed to be conveyed by the conveyors.

A movable transport member, generally 28, is provided to transport articles 22 from the first conveyor 12 onto the second conveyor 14, as generally illustrated in FIG. 1. Movable transport member 28 is disposed within the space 16 defined between conveyors 12,14 and comprises a bridge 30 that extends between the conveyors and is generally flush with upper surfaces 24,26 of conveyors 12,14.

Figure 4B:
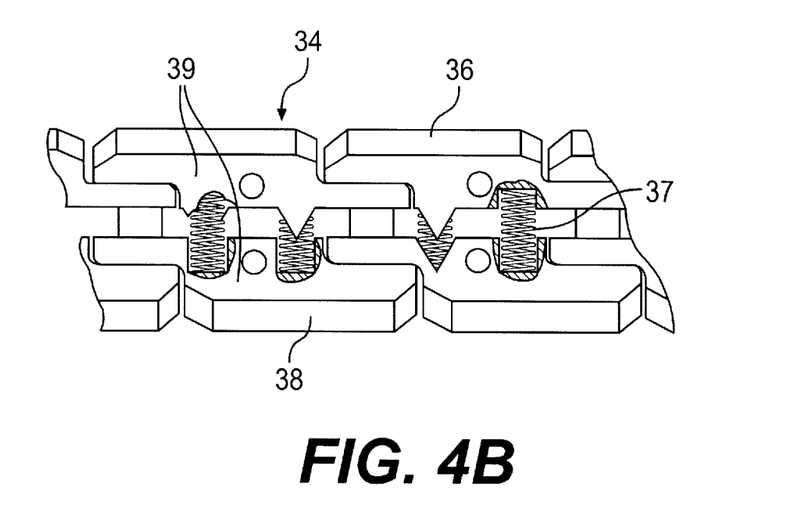
FIG. 4b is an enlarged perspective view of the deformable rail member utilized in the present invention.

In a preferred embodiment of the transport member illustrated in the figures, the bridge 30 comprises a deformable rail member, generally 32. Rail member 32 has dimensions so as to fit between conveyors 12,14 within space 16 over a longitudinal length thereof as illustrated in FIG. 4A. In a preferred embodiment, rail 32 is comprised of a plurality of pivotally connected links 34. In one preferred embodiment, each of the links 34 is composed of a first side component 36, which contacts a side of the conveyor 14 and a second component 38, which contacts the side of the conveyor 12 as shown in FIG. 4A. These components may be constructed of semi-hard or hard material, such as a plastic or a metal. Between these components 36,38, at least one elastic member 37 is disposed. These elastic members 37 may be springs, as shown in FIG. 4A and 4B, or some other resilient material. The elastic members 37 allow for deformation of the links to permit smooth travel along the conveyors 12,14 curves and bends. The links 34 have a height such that their upper surface 39 is flush with the upper surfaces 24,26 of conveyors. Thus, the links 34 when connected form a deformable rail member 32 defining bridge 30.

Transport member 28 may be drivingly engaged by conveyors 12,14 so as to move linearly between the conveyors depending on a speed differential of the conveyors thereby causing the transport member to move in the direction of the faster of the conveyors. In this manner, transport member 28 includes, for example, a drive wheel 42. Drive wheel 42 includes gear teeth 44 that are engaged by drive lugs 40 on the underside of each of conveyors 12,14, as particularly illustrated in FIG. 2. Accordingly, as can be understood from FIG. 2, if conveyors 12 and 14 move in opposite directions but at equal speeds, drive wheel 42 will continuously rotate but will remain in the same relative linear position. Drive wheel 42 will advance in the direction of the faster of the conveyors. It should be appreciated that other drive mechanisms may also be used for moving transport member 28, including separate chain drives, differential gear arrangement, servos, etc. Deformable rail 32 or bridge 30 is connected to drive wheel 42 such that drive wheel 42 either pushes or pulls deformable rail 32 between conveyors 12,14.

An article transfer member, generally 50, is carried by transport member 28. In a preferred embodiment, transfer member 50 may include an article propelling member 52 that is oriented transversely to the first conveyor. The article propelling member 52 drivably engages so that the articles are propel from the first conveyor 12 towards the second conveyor 14. The propelling member preferably gets its power from the drive wheel 42, but other drive system such as listed above may also be used.

Figure 3:
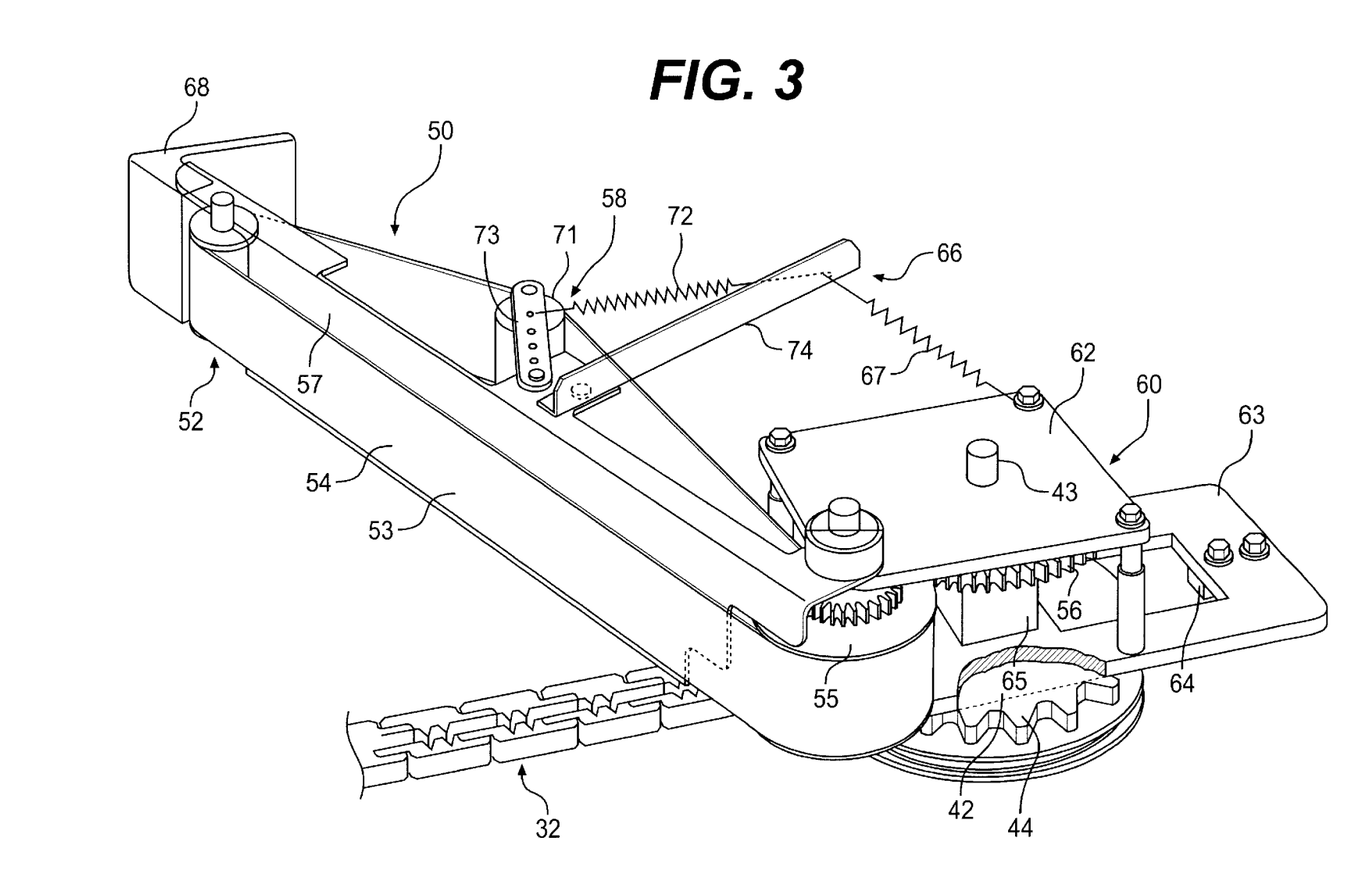
FIG. 3 is a side perspective view of the movable transport member according to the invention.

As illustrated in FIG. 3, the article propelling member 52 may be a belt 53 and a pulley system. The belt 53 can be driven by a drive pulley 55 which is, in turn, driven by a drive gear 56. Drive gear 56 is axially powered by the drive wheel 42, which is powered by the conveyors 12,14 as described above. By being powered by the drive wheel 42, the rotation speed of the belt 53 is kept at a desired speed, which is proportional to the speeds of the conveyors 12,14. The pulley system is connected to a transfer frame 57. The transfer frame 57 is rotatable connected to transport member 28, sharing the same axis as the drive pulley 55. This connection allows a limited swivel of the article transfer member 50, as the article propelling member 52 rotates, to permit flexibility in the positioning of the article transfer member. It should be appreciated the transfer member 50 may be connected to the transport member at other positions as well.

Articles conveyed on first conveyor 12 impact upon an article propelling member 52 with their sides and are directed to slide across bridge 30 between conveyors 12,14 formed by deformable rail member 32 as particularly illustrated in FIG. 1. Thus, the articles simply slide over bridge 30 and onto second conveyor 14 moving in the opposite direction of conveyor 12. In the illustrated embodiment, the transfer frame 57 extends behind a belt face 54 on the side where the articles contact the belt 53 to prevent the unnecessary deformation of the belt 53 that may render the article propelling member 52 less effective. It should be understood that other propelling devices may be used other than belt 53, including oscillating devices, chains, carousels, etc.

In an embodiment where a belt and pulley system is used for an article propelling member 52, a tension device 58 may be used to provide the tautness of belt and allow for easy changing of a belt if it becomes defective. Preferably, the tension device 58 possesses an elastic member 72 to insure the tension within the belt and to allow a changeable tension. In the illustrated embodiment, the tension device 58 comprises a tension roll 71 integral to a tension device arm 73 that is attached to the transfer frame 57. The elastic member 72 is connected between the tension device arm 73 and a transfer frame extension 74. In the present embodiment, the elastic member 72 is a spring. To permit a change in tension, the tension device arm 73 forms openings aligned along its longitudinal center for retaining its end of the elastic member 72. By placing the elastic member 72 in different openings, the tension is varied. It should be understood that any conventional method of forming tension in the belt may be used.

In a preferred embodiment, the transport member 28 comprises a carriage 60 at the head end of the transport member. The carriage 60 permits attachment of the drive wheel 42 and drive gear 56 as well as the article transfer member 50 to the transport member. The carriage 60 provides a housing for the drive gear 56 and its interaction with the drive pulley 55.

In the illustrated embodiment of FIG. 3, the carriage 60 comprises an upper plate 62 and a lower plate 63. The lower plate 63 rides along the upper surface of the conveyors 24,26. The lower plate 63 possesses a carriage guide 64 which rides in space 16 between the edges of the conveyors as seen in FIG. 2. The carriage guide 64 aids in directing the transport member 28 as it moves along the conveyors 12,14. The axle 43 of the drive wheel 42 runs through the lower plate 63. The drive gear 56 is disposed upon the axle 43. A separator element 65 is placed between the drive gear 56 and the lower plate 63, to insure that the drive gear 56 is properly aligned with the drive pulley 55. The upper plate 62 is placed above the drive gear 56, giving protection to the drive gear and the drive pulley 55 as they engage each other.

The positioning of the article transfer member 50 is preferably kept at a desirable angle relative to the conveyors 12,14 to insure optimal transfer of the articles from one conveyor to the next. In a preferred embodiment, a transfer member stabilizer 66 is employed to maintain the article transfer member 50 in the proper position. Desirably, the stabilizer 66 comprises an elastic member 67 which allows for adjustment of the transfer member 50 as it encounters curves and bends in the conveyors 12,14, while keeping the transfer member in proper positioning.

In the illustrated embodiment, the elastic member 67 is a spring connected to the carriage 60 and the transfer frame extension 74. In this embodiment, the first conveyor 12 has an outer lip 23 on its outer edge remote from the second conveyor 14 as seen in FIG. 1. The outer lip 23 extends above the upper surface 24 of the first conveyor 12. The transfer member stabilizer 66 further comprises an angle guide 68 integral to the end of the article transfer member 50 remote from the carriage 60. As the elastic member 67 pulls the swivelled article transfer member 50 towards the carriage 60, the angle guide 68 abuts the outer lip 23 of the first conveyor 12 holding the article transfer member in a specified position relative to the first conveyor 12. Thus, the interaction between the pulling action of elastic member 67 and abutting action of the angle guide 68 maintains the article transfer member 50 within a specified range of angles relative to the conveyors 12,14.

In another preferred embodiment, a second article transfer member 80 may be added to the end of the bridge 30 remote from the first article transfer member 50. The second article transfer member 80 is operably disposed between the conveyors 12,14. The second article transfer member 80 comprises a second article propelling member 82. This article propelling member 82 aids in directing articles 22 remote from the first article transfer member 50 from the first conveyor 12 to the second conveyor 14, by rotatably engaging the articles which contact outer surface 83 of the article propelling member 82 as shown in FIG. 1.

Figure 5:
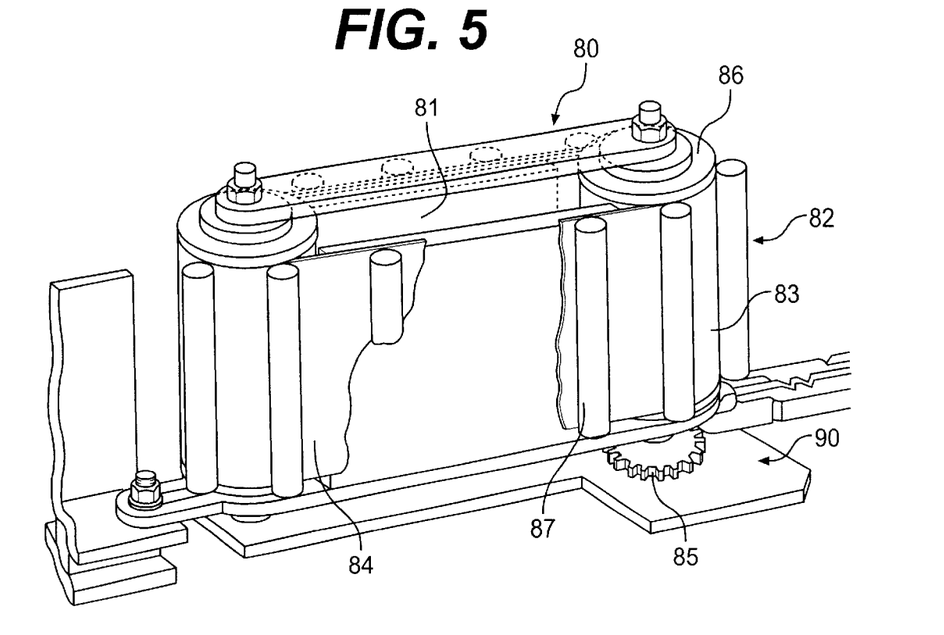
FIG. 5 is a perspective view of the second article transfer member with a cut away view of the belt utilized in the present invention.

In the illustrated embodiment in FIG. 1 and 5, the second article transfer member comprises an endless belt 84 and pulley system. The belt 84 is rotated in the direction so as to pull or push articles 22 from the first conveyor 12 to the second conveyor 14 by a second transfer drive pulley 86. To reinforce the belt 84 as it contacts the articles and to prevent deformation if one conveyor becomes overcrowded with articles, brace plates 81 may be installed on the inside of the belt 84 on both the first conveyor 12 and second conveyor 14 sides.

As depicted in FIGS. 1 and 5, Article gripping members 88 are disposed on the outer surface 83 of the belt 84 in appropriate intervals. These gripping members 88 further enhance the ability of the belt 84 to transfer the articles by allowing the belt to interact with more articles and expediting the contacted articles from the first conveyor 12 to the second conveyor 14. It should be appreciated by those skilled in the art that other propelling devices may be used other than belt 84, including flat belts, chains, carousels, etc. The article gripping members 88, which may or may not be present, may take the form of tubing, flat fingers, curved fingers, a tacky surface, etc.

The second article propelling member 82 may be driven in a variety of ways. In the embodiment illustrated in FIGS.

1, 2 and 5, The second article transfer member 80 contains a base 90 which is located beneath the conveyors 12,14. The drive pulley 86 of the second article propelling member 82 is axially connected to a propulsion sprocket 85 which is position below the base 90. The propulsion sprocket 85 is drivably engaged by a drive chain 92. A remote transfer member drive gear 94 drives the drive chain 92. The remote transfer member drive gear 94 is axially disposed to the drive wheel 42. The drive chain 92 may have a constant tension maintained on it by a tension spring 96 which is connected to the base 90. One end of the tension spring 96 is place on inner edge of one side of the chain and the other end is placed on the outer edge of the same side in a manner which causes tension in the drive chain 92. The tension spring 96 allows for easy removal and replacement of the drive chain 92. As mentioned above, it should be appreciated that other drive mechanisms may also be used for driving the second article propelling member 82, including other chain drive arrangements, a drive wheel, differential gear arrangement, servos, etc.

To align the articles for proper contact with the second article transfer member 80, vertical alignment members 100 may be attached to the end of the second article transfer member remote from the bridge 30. The vertical alignment members 100 also separate the articles on the first conveyor 12 from the articles of the second conveyor 14 and prevents the articles from getting stuck in the space 16 between the conveyors 12,14. The vertical alignment members ride between the conveyors 12,14 as they are being pulled or pushed by the transport member 28. The vertical alignment members 100 extend above the upper surface 24,26 of the conveyor 12,14.

Figure 6:
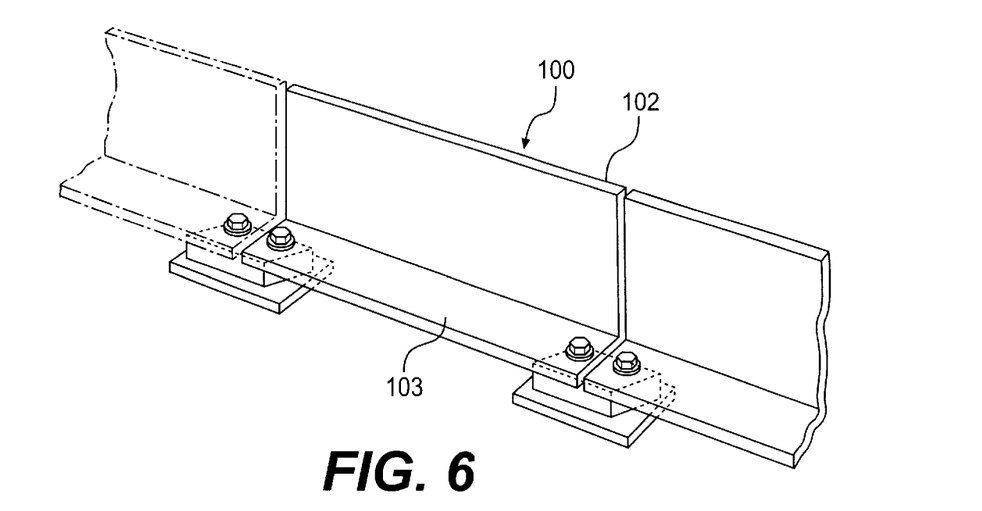
FIG. 6 is a perspective of the vertical alignment members of the present invention.

In a preferred embodiment, referring particularly to FIG. 6, the vertical alignment member 100 may be in the shape of an "L" angle, wherein both webs 102,103 of the "L" angle ride above the conveyors 12,14. As in FIG. 1, the vertical web 102 extends out over the first conveyor 12 and aligns the articles with the second article transfer member 80. The horizontal web 103 extends over the second conveyor 14 to prevent any articles from gravitating towards the space 16 between the conveyors 12,14. It is to be understood that the vertical alignment members may be of different constructions and formations, such as a block, u-shape, connected link or deformable solid, etc.

It should be appreciated by those skilled in the arts that various modifications and variations can be made in the present invention without departing from the scope or spirit of the invention. For example, only one of the two article transfer members mention may be present or drivingly engaged. For instance, the first article transfer member 50 may be stationary, such as a deflecting bar, while only the second article transfer member is drivingly engaged. Likewise, the second article transfer member 80 may not be present when a driven first article transfer member 50 is, in which embodiment the vertical alignment members 100 may still be present. In such an embodiment, the vertical alignment members 100 may define the limit of bridge 30. In other words, bridge 30 is defined between the first article transfer member 50 and the beginning of vertical alignment members 100.

Further, the bridge 30 or deformable rail 32 need not be formed by individual interconnected links, but may be formed by an integral deformable piece of material. Additionally, the arrangement between drive wheel 42 and the other drive and propulsion gears and pulleys can comprise any conventional connecting and engaging configuration. Various other modifications and variations are also possible in the other components of the invention. It is intended that the present invention include such modifications and variations as come within the scope of the appended claims and their equivalents.

What is claimed:

1. An apparatus for controlling the flow of articles, comprising:
   a first conveyor driven in a first direction to convey articles thereon in said first direction, and a second conveyor driven in a second direction opposite to said first direction to convey articles thereon in said second direction;
   said first and second conveyors extending side-by-side and parallel with a space defined therebetween;
   a movable transport member disposed within said space defined between said conveyors and comprising a bridge extending between said conveyors and generally flush with upper surfaces of said conveyors;
   said transport member drivingly engaged by both of said conveyors so as to move linearly between said conveyors depending on a speed differential between said conveyors causing said transport member to move in the direction of the faster of said conveyors;
   an article transfer member carried by said transport member and operably disposed transversely to said conveyors, wherein said article transfer member movably directs articles from said first conveyor to said second conveyor, said article transfer member including an article propelling member that contacts the sides of the articles and drivably propels articles on said first conveyor towards said second conveyor;
   said transport member comprises a drive wheel simultaneously engaged by drive lugs on each of said conveyors so as to continuously rotate so long as at least one of said conveyors is moving;
   said article propelling member has a length so as to extend at least across said first conveyor;
   said article transfer member is rotatably connected to said transport member allowing said article transfer member to properly operate as it moves along the conveyors; and
   said article transfer member further comprises a transfer member stabilizer having an elastic member connected between said article transfer member and said transport member, said transfer member stabilizer preventing said article transfer member from open rotation and maintaining said article transfer member within a specified set of angles relative to the conveyors.

2. An apparatus as in claim 1, wherein said first conveyor further comprises a movable outer lip integral with the upper surface of said first conveyor and extending perpendicular to said conveyor.

3. An apparatus as in claim 2, wherein said transfer member stabilizer further comprises an angle guide disposed at the end of said article transfer member remote from said transport member, said angle guide, working in conjunction with said elastic member, abuts said outer lip of said first conveyor to insure said article transfer member maintains a proper angle relative to the conveyors.

4. An apparatus for controlling the flow of articles, comprising:
   a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a bridge extending between said conveyors and generally flush with upper surfaces of said conveyors;

said transport member drivingly engaged by both of said conveyors so as to move linearly between said conveyors depending on a speed differential between said conveyors causing said transport member to move in the direction of the faster of said conveyors;

an article transfer member carried by said transport member and operably disposed transversely to said conveyors, wherein said article transfer member movably directs articles from said first conveyor to said second conveyor, said article transfer member including an article propelling member that contacts the sides of the articles and drivably propels articles on said first conveyor towards said second conveyor; and said bridge comprises a deformable rail member having dimensions so as to fit between said conveyors over a length thereof.

5. An apparatus as in claim 4, wherein said rail member comprises a plurality of pivotally connected links having an upper surface generally flush with said upper surfaces of said conveyors.

6. An apparatus as in claim 5, wherein each of said links comprises a first side component and a second side component and at least one elastic member between said first side component and said second side component.

7. An apparatus as in claim 4, wherein said bridge comprises a deformable rail having an end connected to said carriage.

8. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a bridge extending between said conveyors and generally flush with upper surfaces of said conveyors;

said transport member drivingly engaged by both of said conveyors so as to move linearly between said conveyors depending on a speed differential between said conveyors causing said transport member to move in the direction of the faster of said conveyors;

an article transfer member carried by said transport member at a first end of said bridge and operably disposed transversely to said conveyors, wherein said article transfer member movably directs articles from said first conveyor to said second conveyor, said article transfer member including an article propelling member that contacts the sides of the articles and drivably propels articles on said first conveyor towards said second conveyor;

said transport member comprising a drive wheel simultaneously engaged by drive lugs on each of said conveyors so as to continuously rotate so long as at least one of said conveyors is moving; and a second article transfer member connected to an opposite end of said bridge remote from said first article transfer member, said second article transfer member operably disposed between said conveyors and comprising a second article propelling member that diverts the articles from said first conveyor to said second conveyor, said second article propelling member comprising a member traveling in an endless path and having an outwardly facing surface with article contacting members disposed thereon to contact and propel the articles from said first conveyor towards said second conveyors.

9. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a bridge extending between said conveyors and generally flush with upper surfaces of said conveyors;

said transport member drivingly engaged by both of said conveyors so as to move linearly between said conveyors depending on a speed differential between said conveyors causing said transport member to move in the direction of the faster of said conveyors;

an article transfer member carried by said transport member and operably disposed transversely to said conveyors, wherein said article transfer member movably directs articles from said first conveyor to said second conveyor, said article transfer member including an article propelling member that contacts the sides of the articles and drivably propels articles on said first conveyor towards said second conveyor;

said transport member comprising a drive wheel simultaneously engaged by drive lugs on each of said conveyors so as to continuously rotate so long as at least one of said conveyors is moving;

a second article transfer member connected to said bridge remote from said first article transfer member, said second article transfer member operably disposed between said conveyors and comprising a second article propelling member that diverts the articles from said first conveyor to said second conveyor; and wherein said second article propelling member comprises a belt driven by said drive wheel.

10. An apparatus as in claim 9, Wherein said belt comprises article gripping members disposed on the outward face of said belt, said gripping members configured to contact and propel the articles from said first conveyor towards said second conveyor.

11. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a bridge extending between said conveyors and generally flush with upper surfaces of said conveyors;

said transport member drivingly engaged by both of said conveyors so as to move linearly between said conveyors depending on a speed differential between said conveyors causing said transport member to move in the direction of the faster of said conveyors;

an article transfer member carried by said transport member and operably disposed transversely to said conveyors, wherein said article transfer member movably directs articles from said first conveyor to said second conveyor, said article transfer member including an article propelling member that contacts the sides of the articles and drivably propels articles on said first conveyor towards said second conveyor;

said transport member comprising a drive wheel simultaneously engaged by drive lugs on each of said conveyors so as to continuously rotate so long as at least one of said conveyors is moving;

a second article transfer member connected to said bridge remote from said first article transfer member, said second article transfer member operably disposed between said conveyors and comprising a second article propelling member that diverts the articles from said first conveyor to said second conveyor; and further comprising vertical alignment members attached to the end of the second article transfer member remote from said bridge, said vertical alignment member extending perpendicular to said first conveyor to insure proper alignment of articles for said second article transfer member.

12. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a carriage member having a drive wheel engaged with drive lugs on each of said conveyors so that said carriage member moves along said conveyors depending on a speed differential between said conveyors causing said carriage member to move in the direction of the faster of said conveyors;

a longitudinally extending deformable rail member attached to said carriage member so as to move therewith relative to said conveyors, said rail member disposed between said conveyors and having an upper surface generally flush with an upper surface of each of said conveyors;

a first article transfer member carried by said carriage member and extending across at least a portion of said first conveyor so that articles on said first conveyor are movably deflected by said first transfer member over said rail member and onto said second conveyor, said first article transfer member comprises a first article propelling member that contacts the side of the articles and is rotatably driven by said drive wheel; and a second article transfer member attached to the end of said rail member remote from said carriage, said second article transfer member comprises a second article propelling member that rotatably engaged the side of the articles so that the articles on said first conveyor are deflected by said second article propelling member over said rail member and onto said second conveyor.

13. An apparatus as in claim 12, wherein said rail member comprises a plurality of interconnected links, said links moveable between the facing edges of said conveyors.

14. An apparatus as in claim 13, wherein said each of said links comprises a first side component and a second side component and at least one elastic member between said first side component and said second side component to facilitate necessary deformation.

15. An apparatus as in claim 12, wherein said first article propelling member and said second article propelling member comprises separate belt and pulley systems powered by said drive wheel so that the belt for each system engagingly propels articles from said first conveyor across said rail members unto said second conveyor.

16. An apparatus as in claim 15, wherein said belt of said second article propelling member comprises article gripping members disposed on the outward face of said belt to aid in transferring the articles from said first conveyor to said second conveyor.

17. An apparatus as in claim 12, further comprising vertical alignment members attached to the end of the second article transfer member remote from said rail member, said vertical alignment members disposed between said conveyors and extending above the upper surface of each of said conveyors.

18. An apparatus as in claim 12, wherein said article transfer member further comprises a transfer member stabilizer having an elastic member connected between said article transfer member and said carriage and an angle guide that is aligned with the outer edge of the first conveyor disposed at the end of said article transfer member remote from said carriage, said transfer member stabilizer maintaining said article transfer member within a specified set of angles relative to the conveyors.

19. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a head end and a tail end extending between said conveyors, and a bridge extending between said head end and said tail end and generally flush with upper surfaces of said conveyors;

said transport member drivingly engaged by both of said conveyors so as to move linearly between said conveyors depending on a speed differential between said conveyors causing said transport member to move in the direction of the faster of said conveyors;

at least one article propelling member carried by said transport member and operably disposed relative to said conveyor to contact the articles and drivably propel articles on said first conveyor across said bridge and onto said second conveyor; and vertical alignment members attached to the tail end of the transport member remote from said bridge, said vertical alignment member extending perpendicular to said first conveyor to insure proper alignment of articles before transfer to said second conveyor.

20. An apparatus as in claim 19, wherein said article propelling member is disposed on the head end of the transport member.

21. An apparatus as in claim 19, wherein said article propelling member is disposed on the tail end of the transport member.

22. An apparatus as in claim 19, wherein an additional article propelling member is disposed on the tail end of the transport member.

23. An apparatus as in claim 19, wherein said transport member comprises a drive wheel simultaneously engaged by drive lugs on each of said conveyors so as to continuously rotate so long as at least one of said conveyors is moving.

24. An apparatus as in claim 19, wherein said article propelling member is driven by said drive wheel.

25. An apparatus as in claim 19, wherein said article transfer member further comprises a transfer member stabilizer having a means for maintaining said article transfer member in a proper position.

* * * * *